(12) United States Patent
Ehlers

(10) Patent No.: US 8,726,716 B2
(45) Date of Patent: May 20, 2014

(54) HYDRAULIC BRAKE CALIPER PISTON INSERTION FORCE GAUGE TOOL

(75) Inventor: Mark Ehlers, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/634,490

(22) PCT Filed: Mar. 15, 2010

(86) PCT No.: PCT/US2010/027282
§ 371 (c)(1),
(2), (4) Date: Sep. 12, 2012

(87) PCT Pub. No.: WO2011/115609
PCT Pub. Date: Sep. 22, 2011

(65) Prior Publication Data
US 2013/0000379 A1 Jan. 3, 2013

(51) Int. Cl.
*G01F 25/00* (2006.01)
(52) U.S. Cl.
USPC .............................................. 73/1.19; 73/865
(58) Field of Classification Search
USPC ......................................... 73/1.19, 856–860
See application file for complete search history.

(56) References Cited

U.S. PATENT DOCUMENTS

| | | | | |
|---|---|---|---|---|
| 4,212,639 A | * | 7/1980 | Schaffner | 433/72 |
| 4,549,727 A | * | 10/1985 | Kozar | 269/70 |
| 5,186,226 A | * | 2/1993 | Wang | 144/144.1 |
| 6,209,403 B1 | * | 4/2001 | Chen et al. | 73/862.627 |
| 8,092,397 B2 | * | 1/2012 | Wallace et al. | 600/587 |
| 2010/0105498 A1 | * | 4/2010 | Johnson | 473/318 |
| 2013/0000379 A1 | | 1/2013 | Ehlers | |

OTHER PUBLICATIONS

Search Report from the parent PCT application.
Published Application from parent PCT application.

* cited by examiner

*Primary Examiner* — Max Noori
(74) *Attorney, Agent, or Firm* — Jeffrey P. Calfa; Mark C. Bach

(57) ABSTRACT

A piston insertion force gauge tool for measuring the insertion force of a piston into a bore of a brake caliper includes a housing assembly having an inner housing member at least partially disposed in an outer housing member, where the housing members are generally coaxial and selectively displaceable along the axis. First and second end members form the ends of the gauge tool. The inner housing member is received into the outer housing member at a second open end. A measuring device extends from the second end member through a first open end and to the first end member. The measuring device displaces the inner housing member with respect to the outer housing member to indicate the insertion force imparted on the piston.

18 Claims, 2 Drawing Sheets

HYDRAULIC BRAKE CALIPER PISTON INSERTION FORCE GAUGE TOOL

BACKGROUND

Embodiments described herein relate to a gauge tool for testing hydraulic circuits such as a brake system of a vehicle, and more particularly, to a gauge tool for testing an insertion force of a brake caliper piston.

Currently no practical test device or method determines whether the force to depress a hydraulic brake caliper piston into its bore is within design specifications. Typically, the technician makes a subjective decision whether the brake caliper should be replaced or whether the brake caliper can continue to be used, which can lead to unnecessary replacements or reuse of calipers that are at or near their useful life.

SUMMARY

A piston insertion force gauge tool for measuring the insertion force of a piston into a bore of a brake caliper includes a housing assembly having an inner housing member at least partially disposed in an outer housing member, where the housing members are generally coaxial and selectively displaceable along the axis. A first end member of the inner housing member and a second end member of the outer housing member are generally perpendicular to the axis and form the ends of the gauge tool. A first open end and a second open end are generally perpendicular to the axis, the inner housing member being received into the outer housing member at the second open end. A measuring device is disposed within the outer housing member and within the inner housing member, and extends from the second end member through the first open end and to the first end member. The measuring device imparts a force to insert the piston into the bore, and the measuring device displaces the inner housing member with respect to the outer housing member to indicate the insertion force imparted on the piston.

Another piston insertion force gauge tool for measuring the insertion force of a piston into a bore of a brake caliper includes a clamp having a body and a screw member, where the screw member is selectively displaceable with respect to the body and generally parallel with the bore. The tool also includes a housing assembly having an inner housing member at least partially disposed in an outer housing member, where the housing members are generally coaxial and selectively displaceable along the axis. A first end member of the inner housing member and a second end member of the outer housing member are generally perpendicular to the axis and form the ends of the gauge tool. A first open end and a second open end are generally perpendicular to the axis, the inner housing member being received into the outer housing member at the second open end. A spring is disposed within the outer housing member and within the inner housing member, and extends from the second end member through the first open end and to the first end member. Displacement of the screw member imparts a force on the housing assembly, and the spring of the housing assembly imparts a force to insert the piston into the bore. Compression of the spring displaces the inner housing member with respect to the outer housing member to indicate the insertion force imparted on the piston.

A method of gauging the insertion force of a piston into a bore of a brake caliper includes the steps of clamping a clamp having a body and a screw member to the brake caliper such that the screw member is generally parallel with the bore, locating a gauge tool between the screw member and the piston bore, and extending the pistons out of the bore. The method also includes the steps of tightening the screw member on the clamp to impart a force on the piston through the gauge tool, inserting the piston into the bore with the gauge tool, and reading a force indicator on the gauge tool.

DETAILED DESCRIPTION

Figure 1:
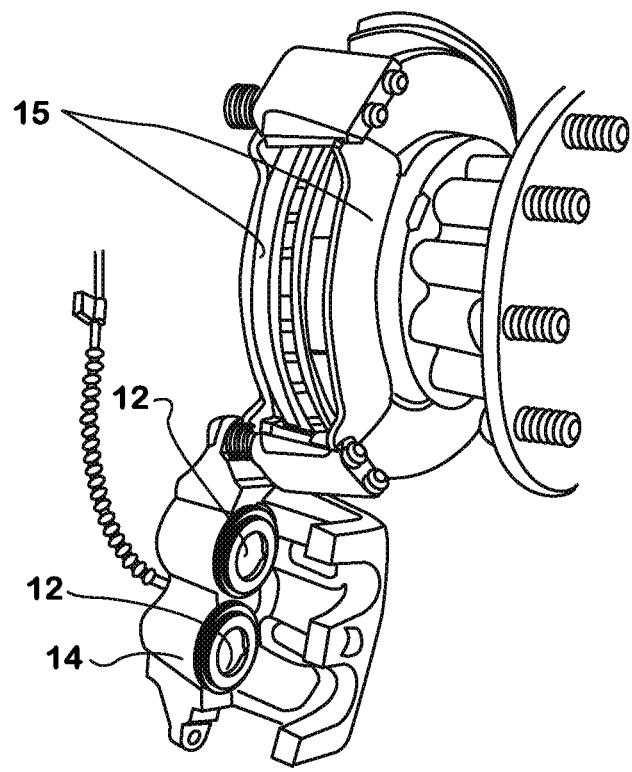
FIG. 1 is a perspective view of brake calipers partially attached to a brake system of a vehicle.
Figure 2:
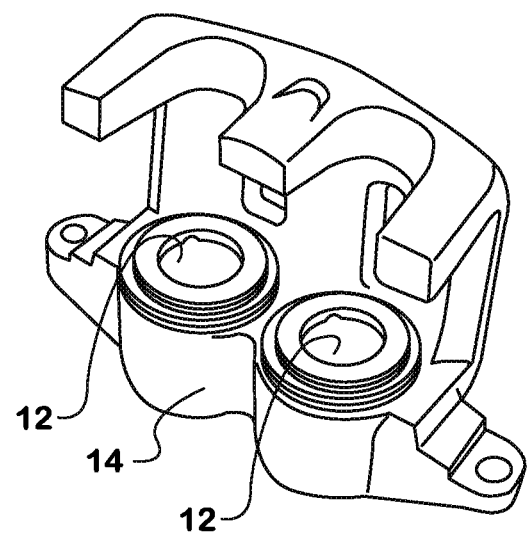
FIG. 2 is a perspective view of the brake calipers.

Referring to FIGS. 1-4, a piston insertion force gauge tool is indicated generally at 10 and is adapted for gauging the insertion force of a hydraulic brake caliper piston (not shown) disposed in a bore 12 of brake calipers 14. The piston force gauge tool 10 can be used both to test the piston insertion force when the brake calipers 14 are partially removed from the brake system, as seen in FIG. 1, or alternately, can be used to test the piston insertion force when the brake calipers are removed from the brake system, as seen in FIG. 2.

The brake calipers 14 house the brake pads 15 (seen in FIG. 1) and pistons (not shown), which slow the vehicle's movement by clamping on a wheel disc (not shown). Each bore 12 of the brake calipers 14 houses a piston, and each piston has an insertion force for inserting the piston into its bore that is designed to be within predetermined design specifications.

Figure 3:
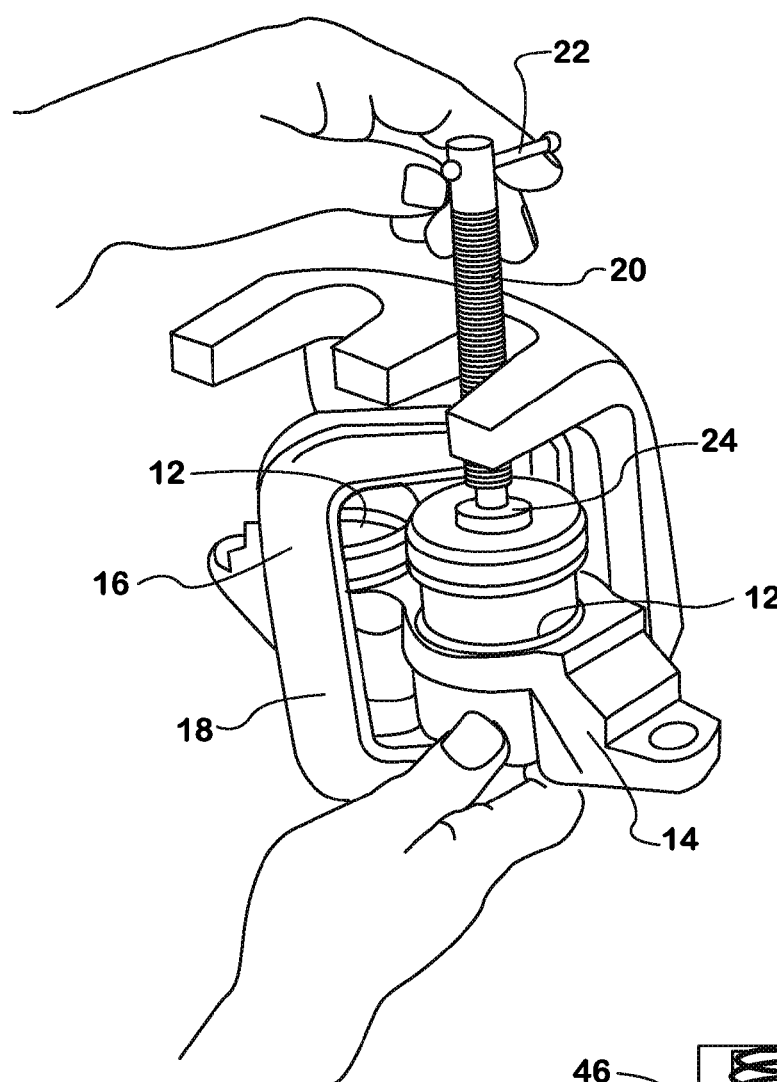
FIG. 3 is a perspective view of a piston force gauge tool on the brake caliper.
Figure 4:
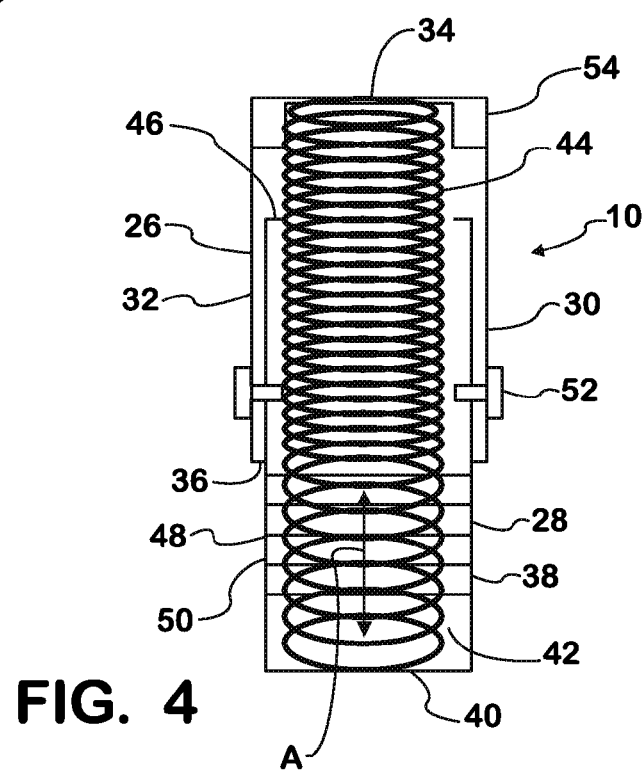
FIG. 4 is a schematic of the piston force gauge tool.

To gauge whether the brake calipers 14 are within the predetermined design specification, a clamp 16 and the gauge tool 10 are used. The clamp 16 may have a C-shape body 18, a screw member 20, a handle 22 and a head 24, although other types of clamps are possible. While only a single clamp 16 is shown in FIG. 3, each bore 12 may have a corresponding clamp. Further, the clamp 16 may have a larger throat of the C-shaped body 18 than shown in FIG. 3. For example, if the brake caliper 14 has two bores 12, two clamps 16 may be used per caliper. Further, the multiple clamps 16 may be operatively linked or fixed together, or the clamp may be a custom tool that clamps down on the multiple bores either separately or at the same time. Instead of being separate tools, it is also possible that the clamp 16 and the gauge tool 10 may be a combined tool.

The clamp 16 is positioned so that the screw member 20 is generally parallel with the bore 12. The gauge tool 10 is disposed between the head 24 of the screw member 20 and the bore 12 of the piston to be tested. The user displaces the screw member 20 of the clamp a predetermined distance, resulting in the gauge tool 10 being located a predetermined distance above the bore 12. The predetermined distance of the gauge tool 10 above the bore 12 is about ⅔ to ¾ the length of a piston, however other distances are possible. When the gauge tool 10 is at the predetermined distance above the bore 12, the user depresses the brake pedal (not shown) or other device or other method, which extends the pistons out of the bore to engage the bottom of the gauge tool. In this configuration, the piston is about ¼ to ⅓ within the bore 12, and ⅔ to ¾ out of the bore, however other lengths are possible.

The piston gauge tool 10 is located between the extended piston and the head 24 of the screw member 20 to measure the insertion force of the piston. The user tightens the clamp 16 to extend the screw member 20, which applies force on the piston force gauge tool 10, which in turn, applies force on the piston.

The piston force gauge tool 10 includes a generally cylindrical housing assembly 26. The housing assembly 26 extends generally parallel from the screw member 20 and is configured to engage the piston. The housing assembly 26 has an inner housing member 28 at least partially disposed in an outer housing member 30, although other shapes of housing assembly are possible. The inner housing member 28 and the outer housing member 30 are generally coaxial, and the housing members are selectively slidable or displaceable along an axis A with respect to each other.

The outer housing member 30 may have a generally cylindrical side wall 32 that is parallel with the axis A, with a closed end member 34 that is generally perpendicular to the axis. The inner housing member 28 has a diameter that is less than the diameter of the outer housing member 30, and the inner housing member is received into the outer housing member at an open end 36 of the outer housing member. The open end 36 is generally perpendicular to the axis A. The diameter of the inner housing 28 may be less than the diameter of the bores 12, or alternately, may have an equal or greater diameter than the diameter of the bores.

The inner housing member 28 may also have a generally cylindrical side wall 38 that is parallel with the axis A, and a closed end member 40 that is generally perpendicular to the axis. The closed end member 40 of the inner housing member 28 is on the opposite end of the gauge tool 10 from the closed end member 34 of the outer housing member 30 forming a generally closed interior volume 42 with the side walls 32, 38. The interior volume 42 may be generally cylindrical shaped.

A measuring device, shown as a spring 44, is disposed within the interior volume 42, and specifically within the outer housing member 30 and within the inner housing member 28. The spring 44 may be a calibrated spring or a spring of known force, however other springs are possible. The spring 44 extends from the end member 34 of the outer housing member 30, through an open end 46 of the inner housing member 28, and to the end member 40 of the inner housing member 28. Alternatively, the measuring device may be a pressure gauge such as a transducer or a load cell.

To determine the piston insertion force, the piston force gauge tool 10 imparts force on the piston to retract the piston into its bore 12 as the user tightens the clamp 16. The force applied by the spring 44 moves the piston down into its bore 12, and the tool 10 measures this force. As the spring force is applied to the piston, the inner housing member 28 is retracted within the outer housing member 30 a distance that correlates to the force imparted on the piston to make the piston retract into the bore 12. Indicators 48, such as graduated marks, are disposed on an exterior surface 50 of the inner housing member 28 and are calibrated to indicate the force imparted to retract the piston within its bore. The user monitors where the open end 46 of the outer housing member 30 aligns with the indicators 48. The indicators 48 may represent a range of forces that are specified for the piston, and the user may monitor whether the force imparted on the piston falls within the predetermined range. Other indicators 48 besides graduated marks can be used.

A lock 52, such as one or more a thumb screws, may be disposed on the outer housing member 30 to prevent the displacement of the inner housing member 28 relative to the outer housing member. When the lock 52 is unlocked, the spring moves the inner housing member 28 and applies a force to the piston to retract the piston as the user tightens the clamp 16. When the lock 52 is locked, the user can lock the position of the outer housing member 30 with respect to inner housing member 28 and the graduated marks 48 so that the user can more easily view the force measurement.

An optional stop member 54 may be located on the side wall 32 or the end member 34 in the interior volume 42 to limit the displacement of the inner housing member 28 within the outer housing member 30. The stop member 54 is configured to prevent over-compression of the spring 44. The stop member 54 may be a ring disposed at the junction of the side wall 32 and the closed end member 34, however any other mechanical stop is possible.

The piston force gauge tool 10 and the clamp 16 allow the user to depress the brake pedal (not shown), which extends the pistons a predetermined distance, without the risk of the pistons extending too far and potentially locking or exiting their bore 12. Further, the brake system does not need to be opened or bled for use of the piston force gauge tool 10. Further still, only one user is needed to test the piston force using the piston force gauge tool 10.

What is claimed is:

1. A piston insertion force gauge tool for measuring the insertion force of a piston into a bore of a brake caliper, the gauge tool comprising:
   a housing assembly having an inner housing member at least partially disposed in an outer housing member, the inner housing member and the outer housing member being generally coaxial along an axis, and the inner housing member and the outer housing member being selectively displaceable along the axis with respect to each other;
   a first end member of the inner housing member and a second end member of the outer housing member are generally perpendicular to the axis and form the ends of the gauge tool;
   a first open end of the inner housing member and a second open end of the outer housing member are generally perpendicular to the axis, the inner housing member being received into the outer housing member at the second open end;
   a measuring device disposed within the outer housing member and within the inner housing member, wherein the measuring means extends from the second end member of the outer housing member through the first open end of the inner housing member and to the first end member of the inner housing member;
   wherein the measuring device imparts a force to insert the piston into the bore, and the measuring device displaces the inner housing member with respect to the outer housing member to indicate the insertion force imparted on the piston; and
   a lock disposed on the outer housing member and configured to prevent the displacement of the inner housing member relative to the outer housing member, wherein the lock is a thumb screw.

2. The gauge tool of claim 1 further comprising indicators on an external surface of the inner housing member, wherein alignment of the second open end of the outer housing member with the indicators indicates the force to insert the piston into the bore.

3. The gauge tool of claim 2 wherein the indicators are graduated marks on the external surface of the inner housing member.

4. The gauge tool of claim 1 wherein the housing assembly is generally cylindrical.

5. The gauge tool of claim 4 wherein the diameter of the inner housing member is less than the diameter of the bore.

6. The gauge tool of claim 4 wherein the diameter of the inner housing member is greater than the diameter of the bore.

7. The gauge tool of claim 1 further comprising a stop member disposed on second end member of the outer housing member.

8. The gauge tool of claim 1 further comprising a stop member disposed on a side wall of the outer housing member.

9. A piston insertion force gauge tool for measuring the insertion force of a piston into a bore of a brake caliper, the gauge tool comprising:
  a clamp having a body and a screw member, the screw member being selectively displaceable with respect to the body and generally parallel with the bore;
  a housing assembly extending generally parallel from the screw member and configured to engage the piston to be gauged, the housing assembly the having an inner housing member at least partially disposed in an outer housing member, the inner housing member and the outer housing member being generally coaxial along an axis, and the inner housing member and the outer housing member being selectively displaceable along the axis with respect to each other;
  a first end member of the inner housing member and a second end member of the outer housing member are generally perpendicular to the axis and form the ends of the gauge tool;
  a first open end of the inner housing member and a second open end of the outer housing member are generally perpendicular to the axis, the inner housing member being received into the outer housing member at the second open end;
  a spring disposed within the outer housing member and within the inner housing member, wherein the spring extends from the second end member of the outer housing member through the first open end of the inner housing member and to the first end member of the inner housing member;
  wherein displacement of the screw member imparts a force on the housing assembly, and wherein the spring of the housing assembly imparts a force to insert the piston into the bore, and compression of the spring displaces the inner housing member with respect to the outer housing member to indicate the insertion force imparted on the piston.

10. The gauge tool of claim 9 further comprising indicators on an external surface of the inner housing member, wherein alignment of the second open end of the outer housing member with the indicators indicates the force to insert the piston into the bore.

11. The gauge tool of claim 10 wherein the indicators are graduated marks on the external surface of the inner housing member.

12. The gauge tool of claim 9 further comprising a lock disposed on the outer housing member and configured to prevent the displacement of the inner housing member relative to the outer housing member.

13. The gauge tool of claim 9 further comprising a stop member disposed on second end member of the outer housing member.

14. The gauge tool of claim 9 further comprising a stop member disposed on a side wall of the outer housing member.

15. The gauge tool of claim 9 wherein the body of the clamp is generally C-shaped.

16. A method of gauging the insertion force of a piston into a bore of a brake caliper, the method comprising the steps of:
  clamping a clamp having a body and a screw member to the brake caliper such that the screw member is generally parallel with the bore;
  locating a gauge tool between the screw member and the piston;
  extending the pistons out of the bore;
  tightening the screw member on the clamp to impart a force on the piston through the gauge tool;
  inserting the piston into the bore with the gauge tool; and
  reading a force indicator on the gauge tool.

17. The method of claim 16 further comprising the step of limiting the travel of the pistons outside of the bore to less than about ¾ of the length of the piston.

18. The method of claim 16 further comprising compressing a spring within the gauge tool to displace an inner housing member with respect to an outer housing member.

* * * * *